US010609116B2

(12) United States Patent
Gillette (10) Patent No.: US 10,609,116 B2
(45) Date of Patent: Mar. 31, 2020

(54) LOCAL SYNCHRONIZATION OF WEB-BASED INTERACTION

(71) Applicant: LeapFrog Enterprises, Inc., Emeryville, CA (US)

(72) Inventor: Troy Gillette, Emeryville, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 178 days.

(21) Appl. No.: 15/793,738

(22) Filed: Oct. 25, 2017

(65) Prior Publication Data
US 2018/0115597 A1    Apr. 26, 2018

Related U.S. Application Data

(60) Provisional application No. 62/412,746, filed on Oct. 25, 2016.

(51) Int. Cl.
*H04L 29/08* (2006.01)
*H04L 7/00* (2006.01)
*G06F 16/178* (2019.01)

(52) U.S. Cl.
CPC ............ *H04L 67/04* (2013.01); *G06F 16/178* (2019.01); *H04L 7/0008* (2013.01); *H04L 67/02* (2013.01); *H04L 67/06* (2013.01); *H04L 67/1095* (2013.01); *H04L 67/12* (2013.01); *H04L 67/18* (2013.01)

(58) Field of Classification Search
CPC ......... H04L 67/02; H04L 67/04; H04L 67/06; H04L 67/12; H04L 67/18; H04L 67/1095; H04L 7/0008; G06F 3/0482; G06F 16/178

USPC .......................................................... 709/219
See application file for complete search history.

(56) References Cited

U.S. PATENT DOCUMENTS

| | | | | |
|---|---|---|---|---|
| 2003/0152901 A1* | 8/2003 | Altenhofen | ............... | G09B 5/00 434/350 |
| 2003/0232318 A1* | 12/2003 | Altenhofen | ............... | G09B 5/00 434/362 |
| 2006/0204942 A1* | 9/2006 | Kimball | .................... | G09B 5/00 434/307 R |
| 2008/0085502 A1* | 4/2008 | Allen | ..................... | G06Q 10/10 434/365 |
| 2009/0006308 A1* | 1/2009 | Fonsen | .................. | H04W 60/06 |
| 2012/0129141 A1* | 5/2012 | Granpeesheh | ........... | G09B 5/08 434/308 |

(Continued)

*Primary Examiner* — Ruolei Zong
(74) *Attorney, Agent, or Firm* — Kilpatrick Townsend & Stockton LLP (57) ABSTRACT

Techniques for providing seamless offline access to web-based interactive activity may include determining a web-based interactive activity to be made available offline, and a set of content files corresponding to the web-based interactive activity. One or more content files from a remote server can be synchronized to the client device. A web browser on the client device can be executed to launch the web-based interactive activity. When the client device is determined to be offline, dynamic activity data for the web-based interactive activity stored in the web storage integrated with the web browser of the client device can be synchronized from a web domain associated with the remote server to a local domain of the client device. The web-based interactive activity can then be accessed while offline using the dynamic activity data in the local domain of the web storage of the web browser of the client device.

20 Claims, 8 Drawing Sheets (56) References Cited

U.S. PATENT DOCUMENTS

2013/0132463 A1\* 5/2013 Garcia-Ascanio ............................ H04L 67/1095
  709/203
2016/0328485 A1\* 11/2016 Dodonov ............ G06F 16/9574
2017/0104840 A1\* 4/2017 Spagnola ............ H04L 67/2852

\* cited by examiner

```
index.html
deploy.json

LF/     __ content.0.0.2.json
        |_ content.0.0.3.json
        |_ images/
        |_ 0.0.1
        |_ 0.0.2
        |_ 0.0.3

ENG_00001/     __ engine.0.1.1.0/      __  // Engine Files
               |                       |_ content.json
               |_ ACTY_00023.1.0.1.0/  __  // Engine based activity
               |                       |_ content.json
               |_ ACTY_00024.0.9.2.0/  __  // Another engine activity
                                       |_ content.json ACTY_00001.0.0.2.1/   __  // Stand alone activity
                      |_ content.json
```

LOCAL SYNCHRONIZATION OF WEB-BASED INTERACTION

CROSS-REFERENCES TO RELATED APPLICATIONS

The present application is a non-provisional of and claims the benefit and priority of U.S. Provisional Application No. 62/412,746, filed Oct. 25, 2016, entitled "Local Retention of Server Side Interaction," the entire contents of which are herein incorporated by reference for all purposes.

BACKGROUND

Web-based interactive content such as game play or educational curriculum typically requires a client device to have an active connection to the internet. When the client device travels out of the range of the internet connection or otherwise becomes offline, the web-based interactive content may become unavailable, and/or progress in the game play or the educational curriculum can be interrupted. This can frustrate a user, and may require the user to repeat the game play or the educational curriculum when network connectivity is re-established before the user can proceed to the next level. While some content such as media content (e.g., songs, movies, etc.) can be stored locally on the client device to make the content available for playback while offline, web-based interactive content that involves user interaction with a web server cannot be simply downloaded and accessed offline because the content may vary depending on the user interactions with the content.

Embodiments of the present invention address these and other problems individually and collectively.

BRIEF SUMMARY

Techniques for providing seamless offline access to web-based interactive activity in accordance with some embodiments may include a process that determines a web-based interactive activity to be made available offline, and a set of content files corresponding to the web-based interactive activity. One or more content files from the remote server can be synchronized to the client device. A web browser on the client device can be executed to launch the web-based interactive activity. When the client device is determined to be offline, dynamic activity data for the web-based interactive activity stored in the web storage integrated with the web browser of the client device can be synchronized from a web domain associated with the remote server to a local domain of the client device. The web-based interactive activity can then be accessed while offline using the dynamic activity data in the local domain of the web storage of the web browser of the client device. According to some embodiments, a client device may include a processor, and a memory storing executable code that implements an interactive learning application, which when executed by the processor, causes the client device to perform the techniques for providing seamless offline access to web-based interactive activity.

DETAILED DESCRIPTION

Web-based interactive content can be a useful medium for delivering learning or educational materials. A user may access the content by using a web browser executing on the user's client device, and the web browser can be directed to an online web page or application hosted by a remote web server host. Unlike conventional media, web-based interactive content delivered to the user can be dynamically adjusted based on the user's interaction with the content. For example, the content delivered via the web browser can be in the form of interactive activities that require the user to complete certain tasks on the web page to facilitate leaning of a skill before proceeding to the next page. As a user makes progress in the curriculum by completing the interactive activities, the remote web server host may keep track of the progress and performance by storing data in the web storage integrated with the web browser of the client device. This data can be used by the web-based interactive activity to adjust the content presented to the user. For example, if a user is performing poorly, content with easier activities can be presented to the user, or if a user is advancing quickly through the activities, content with more challenging activities can be presented to the user.

However, the data stored in conventional web storage of a web browser is domain bound, and is only available to the web pages or applications that are executed from the same domain. For example, when a user is accessing a web page from a web domain at an Internet URL such as domainX.com, data stored to the web storage of the web browser is only accessible by the web pages of domainX.com. Thus, as a user navigates away from domainX.com to another domain such as domainY.com, the web pages of domainY.com would not be able to access the data previously stored by domainX.com, even though the same browser is being used to access both domains. This domain restriction to a browser's web storage is also applicable when switching between online and offline content. Thus, even if an offline copy of a web page or application is stored locally on a client device, the data stored in the web storage of the web browser by the online version would be inaccessible by the offline copy of the web page or application executing in the local domain. Such domain restriction of the web storage contents can prevent seamless transition when switching from one domain to another.

In order to provide seamless offline access to web-based interactive activity content, an interactive learning application according to some embodiments of the present invention may synchronize not only the set of content files corresponding to the interactive activity from a remote host server to the local client device, but also synchronize dynamic activity data between the local and web domains stored in the web storage of the web browser of the client device. In this manner, the dynamic activity data is mirrored from the online web domain to the local domain to make them available when the client device is offline, and vice versa. As a result, seamless continuity of the interactive activity content can be achieved regardless of whether the content is being accessed online or offline.

Figure 1:
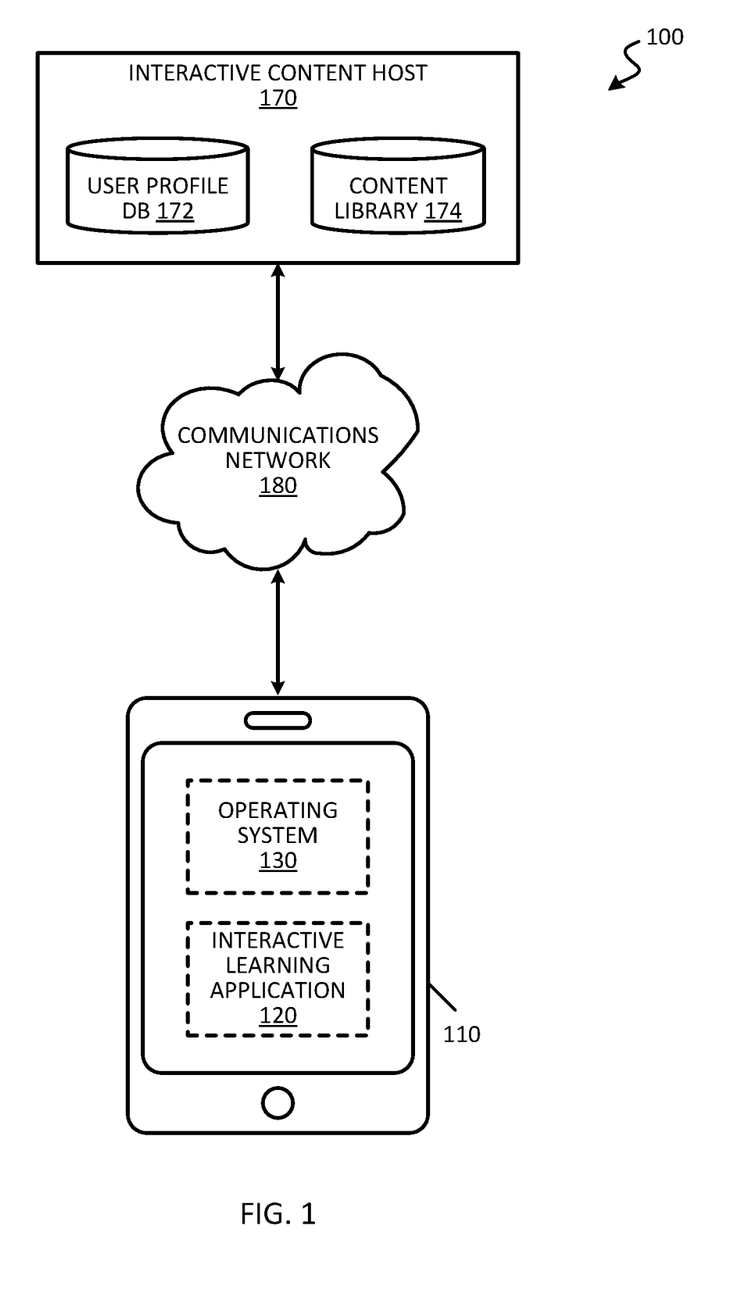
FIG. 1 illustrates a block diagram of a system for providing web-based interactive content, according to some embodiments.

FIG. 1 illustrates a system 100 for accessing web-based interactive activity content, according to some embodiments. System 100 may include an interactive content host 170 and a client device 110 that communicates with the interactive content host 170 via a communications network 180 such as the Internet. Interactive content host 170 may include one or more remote servers (e.g., web servers) and databases that host a website for providing interactive activity content such as web-based game play, educational curriculum, etc. Interactive content host 170 may include a user profile database 172 and content library 174. User profile database 172 may store user account information such as user identification information, user credentials such as usernames and associated passwords, user preferences such as skill or educational level, and dynamic interactive activity data such as progress status in a game play or curriculum, game saves, etc. For example, a parent can register one or more children with interactive content server 172 to gain access to the interactive activity content hosted by interactive content server 172. A user profile can be created for each child and stored in user profile database 172. Depending on the age or education level of the child, a suitable curriculum of games and learning activities can be made available to the child. As the child completes activities in the curriculum, the completion status can be stored in user profile database 172 to track the child's progress.

Content library 174 may store a collection of web-based interactive activities that can be accessed via the Internet. The interactive activities may include content to promote or assist a child in learning various skills or subjects such as literacy, math, science, creativity, health, problem solving, etc. Such interactive activity content may include games, mini-games, and/or short activities. For example, the interactive activities may include: puzzles in which the user is requested to arrange puzzle pieces to form a unified image; sequencing activities in which the user is requested to place letters, numbers, words, or images to complete a concept or idea (e.g., to complete a sentence, equation, or to categorize objects); swiping mini-games in which the user is requested to tap, swipe, or select and move displayed objects to complete a task or a challenge; scrolling game adventure in which the user is requested to control a character in a game with a moving background to achieve an objective; etc. Each interactive activity may have a certain theme (e.g., animals, food, vehicles, etc.) and/or educational concept (e.g., math, language, cognitive skill, etc.) associated with it.

Each web-based interactive activity may have a set of corresponding content files that are used to build and execute the particular activity. For example, the content files may include images, audio, video, and/or executable code (e.g., executable scripts) that are used to generate and render the interactive activity on a client device. In some embodiments, an activity engine can be used to provide a common platform from which multiple interactive activities are built from. An activity engine may include a set of executable code that can be shared amongst multiple interactive activities such as executable code for common game play functions. For example, a puzzle engine may include executable code for providing a drag and drop interface and generation of puzzle pieces of various shapes depending on the difficulty level. Multiple puzzle activities can be built from this common puzzle activity engine, for example, by changing the puzzle image (e.g., image with different theme or educational concept) and/or difficulty level, etc. As another example, a sequencing engine may include executable code for providing a user interface for selecting objects and placing them in specified locations. Multiple sequencing activities can be built from this common sequencing activity engine, for example, by changing the background image and the movable objects to target specific skills (e.g., letters for spelling, numbers for counting or math, etc.). In some embodiments, an interactive activity can be a standalone activity without any shared engine. For example, a learning adventure game in which a character explores a virtual area to reveal fun facts can be a standalone activity that does not share a common platform with other activities.

Client device 110 can be a portable communication device such as a laptop computer, a mobile phone, a tablet computer, a portable toy such as a learning pad, etc. In some embodiments, client device 110 can also be other types of network-capable computing device such as a desktop computer, gaming console, smart television, set-top box, etc. Client device 110 may include an operating system 130 and an interactive learning application 120 installed on client device 110. Interactive learning application 120 can be an application developed by the same service provider as interactive content host 170, and can be compatible with different operating systems. In some embodiments, interactive learning application 120 can be downloaded from an app store, or be preloaded onto client device 110. Interactive learning application 120 may have an integrated web browser, or may invoke a separate web browser installed on client device 110 to access web pages and/or web applications.

A user operating client device 110 may launch interactive learning application 120 to invoke a web browser to gain access to the web-based interactive activities hosted by interactive content host 170. For example, upon launching interactive content host 170, a user may be requested to provide login credentials to gain access to content library 174. Once the credentials have been verified, a menu of available interactive activities can be presented to the user. The user may then select an interactive activity to engage in, and the interactive activity can be executed from interactive content host 170 and be rendered on client device 110 via communications network 180. Interactions of the user with the interactive activity can be transmitted to interactive content host 170 to allow interactive content host 170 to track the progress of the user. For example, interactive content host 170 can determine if the user has successfully completed a task or achieved certain skill to allow the user to move on to the next level or next activity.

In some embodiments, interactive content host 170 may store data on client device 110 to facilitate the interactive activities. For example, interactive content host 170 may store user profile information, progress status, game saves, etc. on client device 110. To facilitate such client-side storage, a web browser can be integrated with web storage that allows a web host to store data on the client device. The web storage can be dedicated for the web browser, and a predetermined amount of storage space can be reserved for the web browser when the browser is initially installed on the client device. It should be noted that the web storage is different than the general storage available on the client device in that the web storage may not be visible to a file system and/or operating system, and may be accessible only through the web browser. For example, the web storage can be implemented using Hypertext Markup Language (HTML) storage, and may be accessible only through HTML function calls.

However, as discussed above, such web storage is typically domain bound, and data written to the web storage by one domain may become inaccessible when the web browser navigates to a different domain. Thus, data written to the web storage by interactive content host 170 while the interactive activity is being executed online from interactive content host 170 will become inaccessible when the web browser switches to executing the interactive activity locally from client device 110. This may occur, for example, when network connectivity of client device 110 is interrupted (e.g., when client device 110 travels out of the range of the network connection, network connection is blocked because of excessive data usage, service interruption due to network equipment malfunction, etc.). Without access to the data in the web storage written by interactive content host 170, the interactive activity being executed locally from client device 110 may not know where the user last left off. As such, the user may have to repeat or restart the interactive activity.

Figure 2:
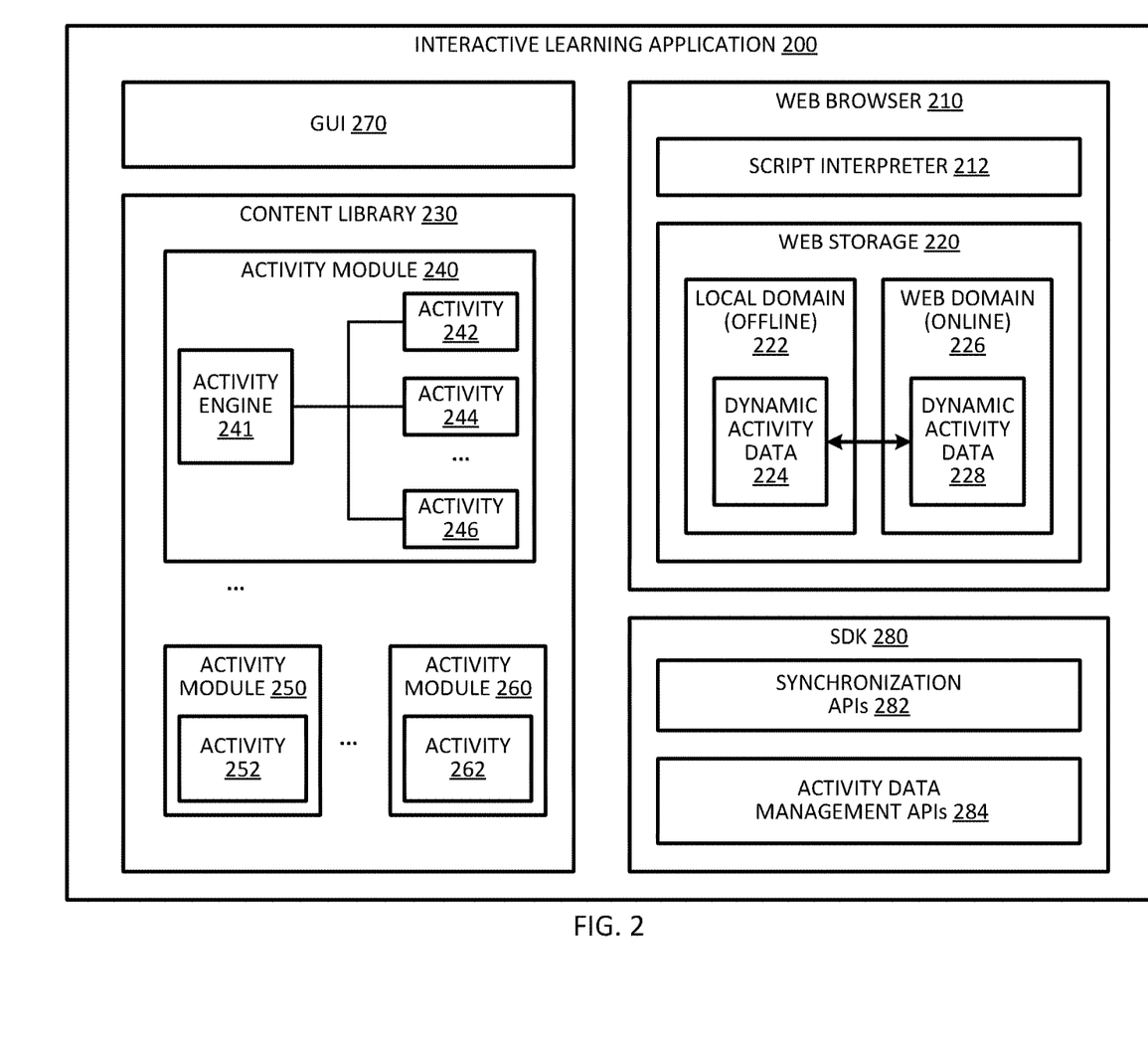
FIG. 2 illustrates a conceptual block diagram of an interactive learning application, according to some embodiments.

FIG. 2 illustrates a conceptual block diagram of an interactive learning application (e.g., interactive learning application 120) installed on a client device that can provide seamless transition between online and offline modes, according to some embodiments. Interactive learning application 200 may include a graphical user interface (GUI) 270, software development kit (SDK) 280, web browser 210, and/or content library 230. GUI 270 may provide a user interface to allow a user to interact with interactive activity content. At startup of interactive learning application 200, GUI 270 may provide a login screen for a user to enter credentials to gain access to web-based interactive activity content hosted by an interactive content host. GUI 270 may allow a user to select customizable profiles including a customizable avatar that represents the user during game play. Once a profile and avatar has been selected, GUI 270 may provide a landing page (e.g., a home page) that acts as a hub to provide a user with access to various user information and interactive activity content. For example, the landing page may allow a user to access an educational curriculum of interactive activities that has been customized for the user, and may indicate the progress of the user in the educational curriculum. The landing page may also provide access to a content catalog of interactive activities that the user may choose from. The interactive activities in the content catalog can be categorized by age and/or skill level, content type (e.g., books, games, puzzles, videos, music, art, favorites, etc.), subject matter or target skill (e.g., literacy, math, science, creativity, health, problem solving, etc.), etc. The landing page may also provide shortcuts to content categorized by content type such as recently accessed books, games, puzzles, videos, music, art, and favorites.

Content library 230 may include content such as web-based interactive activities stored locally on the client device. In some embodiments, a user may select which interactive activity hosted by an interactive content host is stored locally to allow offline access to the interactive activity. For example, a user may mark an interactive activity as a favorite to have the interactive activity stored locally on the client device. Each interactive activity can be implemented as a web-based scripted application (e.g., a JavaScript application), and a set of content files that are necessary for the client device to run and execute the interactive activity can be downloaded from the interactive content host and stored locally on the client device. The set of content files may include executable code such as executable scripts as well as images, audio, and video files that are used to build the interactive activity. In some embodiments, each interactive activity may also include a content description file that indicates which content files are needed to build and execute the interactive activity. For example, the content description file may include a listing of the set of content files corresponding to the interactive activity, and may also include the size, version number, checksum, etc. of each content file.

In some embodiments, an interactive activity can be a standalone activity (e.g., interactive activities 252 and 262) in which all content files for the corresponding interactive activity are self-contained. The set of content files for the corresponding interactive activity can be downloaded as a single package, and the downloaded package can be unpacked and stored locally on the client device in an individual activity module (e.g., an individual folder corresponding to the standalone interactive activity). For example, the content files corresponding to interactive activity 252 can be stored in activity module 250, and the content files corresponding to interactive activity 262 can be stored in activity module 260.

In some embodiments, an interactive activity can be engine-based and may share a common activity engine (e.g., activity engine 241) with other similar activities (e.g., interactive activities 242, 244, 246). The activity engine may include executable code (e.g., executable scripts) that is common to multiple interactive activities. For example, the activity engine may provide executable code for common game play functionalities, user interface, etc. to provide a common look and feel for multiple interactive activities. In some embodiments, an activity engine may also include common media (e.g., images, audio, video) that is shared amongst multiple interactive activities. By sharing the activity engine amongst multiple interactive activities, only one copy of the content files corresponding to the activity engine needs to be saved on client device. This can reduce the amount of storage space used by interactive learning application 200. The sets of content files for the activity engine and the multiple interactive activities that depend on the shared activity engine can be downloaded as a single package, and the downloaded package can be unpacked and stored locally on the client device in an activity module that contains both the activity engine and the multiple interactive activities. For example, activity engine 241 and interactive activities 242, 244, and 246 can be stored in activity module 240. In some embodiments, the content files for each interactive activities 242, 244, and 246 can be stored in a subfolder at the root of activity module 240. The content files for activity engine 241 can also be stored, for example, in a subfolder at the root of activity module 240.

Various activity engines and interactive activities can be implemented. For example, a puzzle engine may provide an intuitive drag and drop interface to allow a user to piece portions of an image together. The puzzle may provide user with educational content or facts when completed, such as an alphabet tutorial ("Aa is for apple"), or an arrange of shapes resembling an object such as an animal. In some embodiments, tangrams can become animated once the puzzle is completed. As another example, a sequencing engine may provide an interface with a selection of interactive elements that can be dropped in place to build words, number sequences, sentences, or equations. Different skins can be applied to each activity. In some embodiments, a sequencing engine may provide an interactive environment to allow a user to put story events in order. As a further example, a mini-game engine may provide game play. Tunable elements such as movement patterns, gravity, object speed, object density, spawn rate, etc. can be modified to provide different gaming experiences and different levels of game play. Various skins can provide different themes for the different game plays. In addition, a 2-D scrolling engine may support horizontal and/or vertical scrolling, and the scrolling can be automatic or in response to user input. Activities based on the 2-D scrolling engine can range from controlling a character to collect letters to complete the alphabet, shoot at objects, traverse through obstacles, etc.

Web browser 210 may provide functionalities to allow interactive learning application 200 to access web-based content. For example, web browser 210 may include a script interpreter 212 to parse and execute web-based programming code such as HTML, JavaScript, etc. to render an interactive activity on the client device by loading one or more files from content library 230 or from a remote interactive content host. In some embodiments, the functionalities of web browser 210 can be integrated into interactive learning application 200 as shown, or web browser 210 can be a standalone browser application on the client device that interactive learning application 200 can invoke. It should be understood that any references to invoking a web browser can mean invoking browser functionalities that are integrated into interactive learning application 200, or invoking a separate web browser application.

Web browser 210 may also include web storage 220 that is integrated with web browser 210. For example, web storage 220 can be implemented as a predetermined amount of memory space on the client device that is reserved for web browser 210. The predetermined amount of memory can be allocated to web browser 210 when web browser 210 and/or interactive learning application 200 is installed on the client device, and may not be deallocated unless web browser 210 and/or interactive learning application 200 is removed from client device. In some embodiments, web storage 220 may be accessible only via web browser 210. For example, the contents of web storage 220 can be accessible only by execution of HTML code on web browser 210. As such, the contents of web storage 220 may not be directly accessible by other applications, other web browsers, and/or the operating system of the client device. In some embodiments, web storage 220 may include local storage and session storage. Local storage may provide persistent storage for data that is retained even when the web browser is closed, whereas data stored in session storage may be deleted when the browser session ends. Both local storage and session storage can be domain bound such that data written by a web page or web application executing from one domain cannot be directly accessed by a web page or web application executing from another domain.

In some embodiments, a web-based interactive activity may store dynamic activity data including user profile information such as user accounts and preferences (e.g., skill level, target skill selection, avatar selection, etc.), authentication tokens, progress status such as statistics and scores, game saves, and/or dynamic configuration information for the interactive activity, etc. in web storage 220. The dynamic configuration information for an interactive activity may include information used to configure the interactive activity such as difficulty level, skin and theme, movement patterns, object speed, density, and spawn rates for game play, etc. The configuration information may dynamically change depending on the progress attained by the user, and such changes can be maintained by storing the relevant information in web storage 220.

As discussed above, because of the domain restrictions imposed by web storage 220, the dynamic activity data stored while an interactive activity is being executed online can become unavailable when executing the interactive activity offline, and vice versa. For example, when network connectivity is available for the client device, a user may launch an interactive activity from the remote interactive content host. During game play, the interactive activity executing in the online or web domain may store game play status and progress as dynamic activity data 228 in web domain 226 of web storage 220. When network connectivity is lost or becomes unavailable, the user may execute the interactive activity offline from a local copy of the corresponding content files stored in content library 230. However, because the local interactive activity is being executed from the local domain, conventional techniques may not allow the local interactive activity to access dynamic activity data 228 stored in web domain 226 of web storage 220. As such, any progress made by the user in the interactive activity or other changes to the dynamic activity data made while online will become unavailable when the client device is offline. Similarly, when the interactive activity is being executed offline, the data written by the local interactive activity will be stored as dynamic activity data 224 in local domain 22 of web storage 220. Conventional techniques may cause dynamic activity data 224 stored while offline to become unavailable when the client device regains network connectivity and executes the interactive activity online.

In order to provide seamless transition between online and offline accesses to an interactive activity, interactive learning application 200 may mirror and synchronize the dynamic activity data between local domain 222 and web domain 226 such that any changes made to the dynamic activity data in one domain is made available to the other domain. The cross-domain synchronization can be performed for both local and session storages. Various mechanisms can be used to clone the dynamic activity data between the different domains.

In some embodiments, before a web page or web application is reloaded, or a new web page or web application is loaded by web browser 210, the contents of web storage 220 in the most-recent domain are extracted and cached by interactive learning application 200. The extracted contents are then injected into the new domain of the client device before reloading or loading the web page. For example, suppose web browser 210 is rendering an online web page corresponding to an interactive activity, the interactive content host may store dynamic activity data 228 in web domain 226 of web storage 220. When the client device loses network connectivity and the interactive activity is switched to offline mode, before the web page is reloaded from the local domain, web browser 210 may read out and cache the contents of dynamic activity data 228 in the application memory of interactive learning application 200. Web browser 210 may then open a window in the local domain. Prior to loading the local web page, the cached contents of the dynamic activity data are written to local domain 222 of web storage 220. In this manner, as the local web page is being rendered, any dynamic activity data used by the local web page in local domain 222 will reflect the latest values written in web domain 226 prior to loosing network connectivity.

In some embodiments, the dynamic activity data can be cached to the application memory of interactive learning application 200 whenever the dynamic activity data is written or modified in web storage 220. For example, when an interactive activity is being accessed online and a storage event to the web storage 220 is detected, the contents of the dynamic activity data in web domain 226 can be cached to the application memory. Before a web page or web application is reloaded, for example, when the client device becomes offline, the cached contents of the dynamic activity data can be written to local domain 222 to synchronize the dynamic activity data across the different domains. Similar processes can be implemented whenever a new web page or web application is loaded (e.g., when a user progresses to the next level or launches a new activity), as well as whenever an interactive activity transitions from offline mode back to online mode.

According to some embodiments, interactive learning application 200 may include a SDK 280 to provide a set of application programming interfaces (APIs) to implement at least some of the functionalities discussed above. SDK 280 may include activity data management APIs 284 that provide functionalities to manage the dynamic activity data used by the interactive activities. For example, while the client device is online, activity data management APIs 284 can be invoked to obtain dynamic activity data from the remote interactive content host for storage in the client-side web storage 220. Activity data management APIs 284 may obtain the dynamic activity data using secure representational state transfer (REST) calls. The responses from the remote interactive content host can be stored in web domain 226 of web storage 220. In some embodiments, the data requests may include a security token in the header for authentication.

The security token can be obtain, for example, when a user first logs onto the remote interactive content host at startup of interactive learning application 200. The security token can also be stored locally to provide offline authentication if an interactive activity or other content provided by interactive learning application 200 requires subsequent authentication while the client device is offline. Activity data management APIs 284 may also be invoked to perform cross-domain synchronization of the dynamic activity data according to the techniques described above whenever web browser 210 is navigated to a new page or whenever a current page is being reloaded. For example, activity data management APIs 284 may provide the interface between web storage 220 and the application memory of interactive learning application 200 such that the contents of web storage 220 can be cached and read out from the application memory. Activity data management APIs 284 may also provide handles to detect storage events to trigger the caching of the dynamic activity data when the contents of web storage 220 is written or modified.

SDK 280 may also include synchronization APIs 282 that provide functionalities to synchronize content between interactive learning application 200 with interactive content host 170. For example, synchronization APIs 284 can be invoked to download a set of interactive activities such that the interactive activities can be made available offline. In some embodiments, the interactive activities to be made available offline can be, for example, interactive activities that have been marked as favorites by a user. Synchronization APIs 284 may provide functionalities to synchronize the content files associate with the interactive activities such as checking the version number of the content files and downloading a new version when such is available from interactive content host 170. In some embodiments, synchronization APIs 284 may also be invoked to update SDK 280 itself as well as GUI 270 when a new version is available from the interactive content host.

In some embodiments, the process to update SDK 280 and/or GUI 270 can be invoked whenever interactive learning application 200 is started while the client device is online. This may happen before anything else when the application is launched to ensure that SDK 280 and/or GUI 270 are running on the latest code. The update can be triggered by checking the version numbers of the local copy of SDK 280 and/or GUI 270 against the ones on the online interactive content host. If the local version of SDK 280 and/or GUI 270 on client device is older, then an update of SDK 280 and/or GUI 270 is initiated. In some embodiments, SDK 280 and/or GUI 270 may have a content description file associated with it to indicate a set of source files that corresponds to SDK 280 and/or GUI 270. The local content description file on the client device can be compared against the online content description file. A new folder can be created locally on the client device, and all common, unchanged files in the two content description files are copied from the current local folder into the newly created one.

Next, any files that have modified or have been added are downloaded from the interactive content host into the new folder (including the new content description file itself). Finally, the old local folder is replaced with the new one. After update of SDK 280 and/or GUI 270 is finished, interactive activities can be updated in the background using a similar technique. The set of content files for an interactive activity can be arranged in a directory structure at the interactive content host, and the directory structure together with the content files can be synchronized to the client device. According to some embodiments, activity engines can be downloaded before any interactive activities because the interactive activities may depend on the activity engines. Further, in some embodiments, the folders for the interactive activities and activity engines may each contain their version numbers, so instead of replacing the old local copy, the old local copies of the content files are simply marked for removal at a later time (e.g., when they are not being played or executed).

Figure 3:
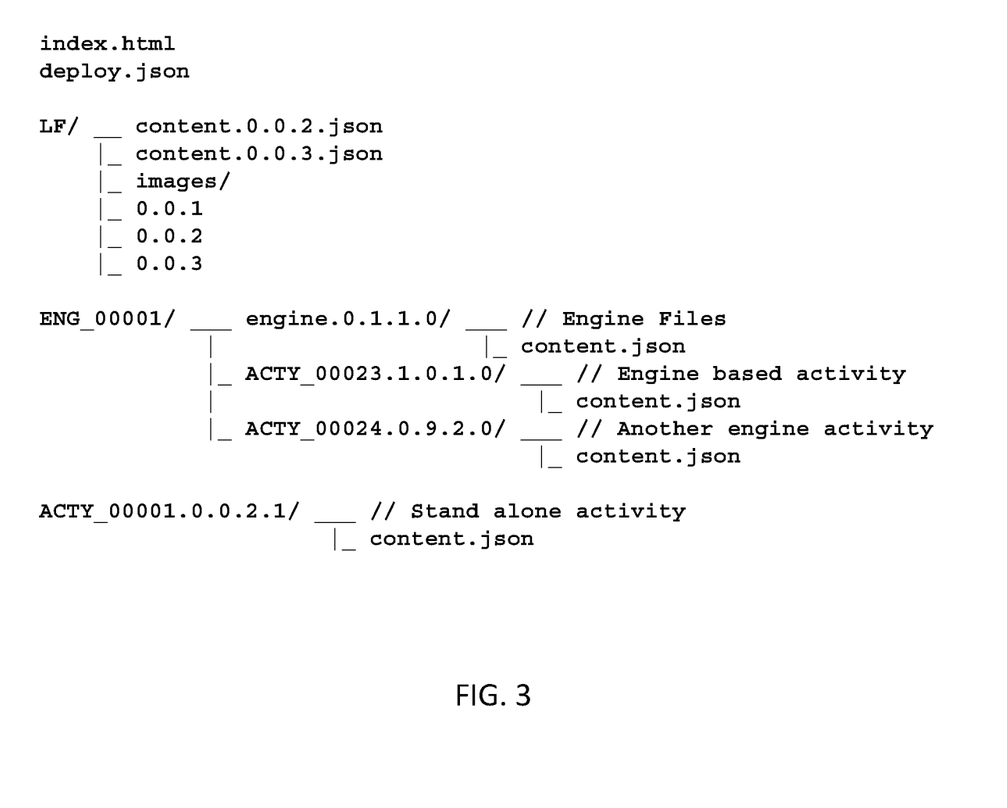
FIG. 3 illustrates a directory structure of files for an interactive learning application, according to some embodiments.

FIG. 3 illustrates a directory structure of source files for an interactive learning application, according to some embodiments. In some embodiments, references to the various source and content files are made using relative paths instead of absolute paths. The directory structure can be mirrored and synchronized between the client device and the interactive content host. In this manner, transitions and function calls between files used when executing the SDK and the interactive activities can be made seamless when the client device switches between online and offline modes.

In FIG. 3, a SDK folder (e.g., "LF") containing the SDK (and/or GUI) source files, an activity engine folder (e.g., "ENG") for an activity engine and its corresponding interactive activities, and an interactive activity folder (e.g., "ACTY") may reside at the root of the directory structure. A root configuration file (e.g., "deploy.json") at the root of the directory structure can be used to determine the current SDK version (in the SDK folder) and therefore the correct content description file (e.g., "content.json") to use for updating the SDK. The SDK folder may contain one or more content description files corresponding to different SDK versions indicating the set of source files needed to implement and run the SDK. The actual source files for the SDK including content such as images and files containing executable code may also reside in the SDK folder.

Engine-based interactive activities that share a common activity engine can reside under the activity engine folder together with the activity engine. For example, under the activity engine folder, there can be an engine content folder to store a content description file and the set of content files needed to execute and run the activity engine. Each engine-based interactive activity may have its own activity content folder under the activity engine folder to store a content description file and the set of content files needed to execute and run the interactive activity. In the example shown in FIG. 3, there are two interactive activities associated with the activity engine. In some embodiments, the activity engine folder (e.g., "ENG") can be unversioned, and the engine content folder and activity content folders under the activity engine folder can be versioned to simplify updating and synchronization of the content files on the client device. Standalone interactive activities can have their activity content folder at the root level of the directory structure and can also be versioned.

Figure 4:
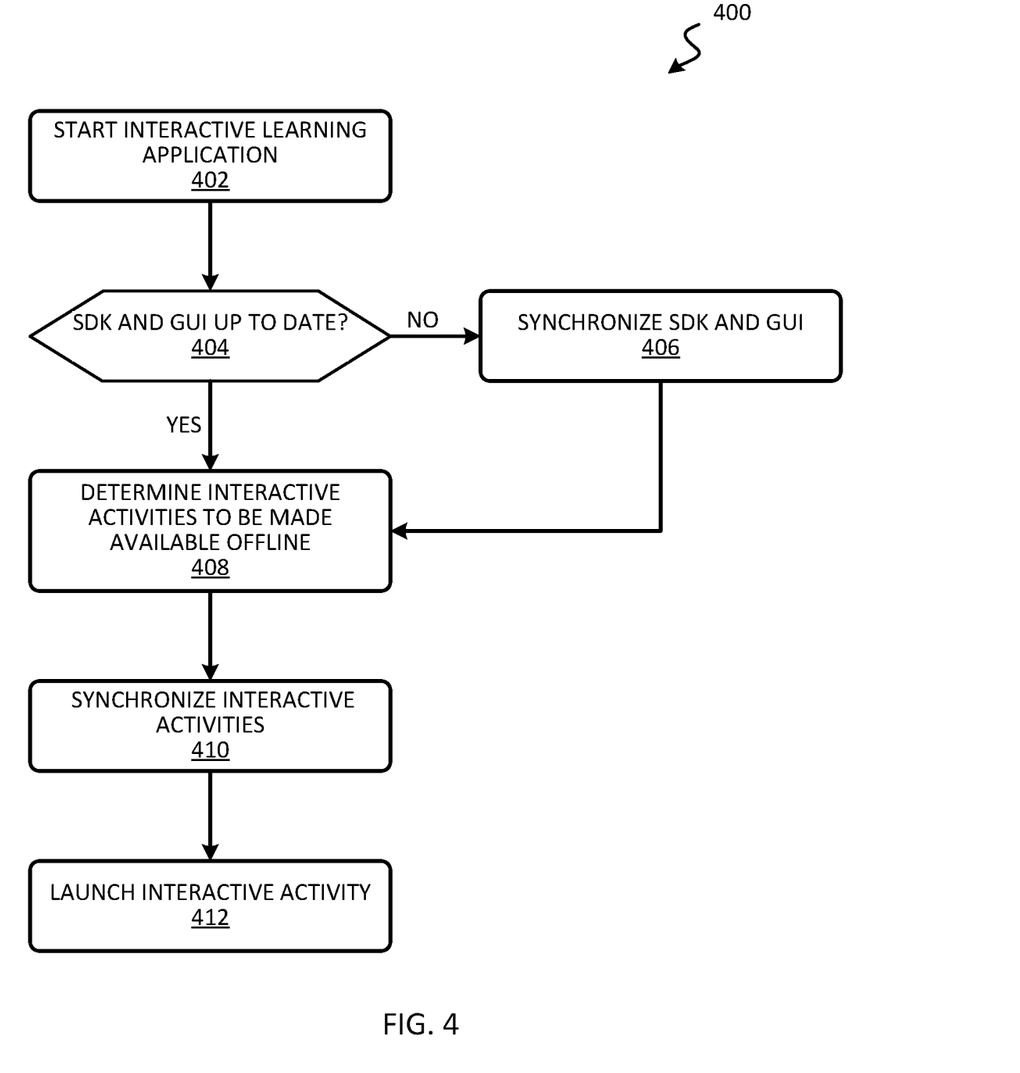
FIG. 4 illustrates a diagram of a process for executing an interactive learning application, according to some embodiments.

FIG. 4 illustrates a flow diagram of a process 400 for executing an interactive learning application with web-based interactive activities on a client device, according to some embodiments. At block 402, the interactive learning application is started on a client device. For example, a user may select the interactive learning application from a set of available applications on the client device. In some embodiments, the client device can be a custom client device, and the interactive learning application can be automatically started when the client device powers up. In some embodiments, the interactive learning application is started when the client device is online and has network connectivity to communicate with an interactive content host such as a remote server.

At block 404, the interactive learning application determines if the local copy of the SDK (e.g., application programming interfaces) and/or GUI on the client device is up to date. For example, the local version number of the SDK and/or GUI can be compared with the latest version number at the interactive content host. If a newer version is available at the interactive content host, the new version of the SDK and/or GUI can be synchronized from the interactive content host to the client device. For example, a newer version of an API can be downloaded from the interactive content host to the client device. In some embodiments, only the source files that have changed need to be downloaded. In some embodiments, the SDK and/or GUI can be synchronized prior to synchronizing the content files of any inter-activity activity, because the APIs implemented in SDK may be used to perform communications with the interactive content host. This can ensure that the SDK and/or GUI are running the latest code (e.g., with the latest security or code patches) when communicating with the interactive content host subsequently to synchronize the interactive activities.

At block 408, after the SDK and/or GUI have been updated, the interactive learning application executing on a client device may determine which interactive activity is to be made available offline. For example, an interactive activity from a content catalog that has been marked as a favorite by a user can be determined to be made available offline. In some embodiments, a user may explicitly select an offline mode for an interactive activity to indicate the interactive activity is to be made available offline. At block 410, the interactive activities determined to be made available offline is synchronized between the interactive content host and the client device.

Figure 5:
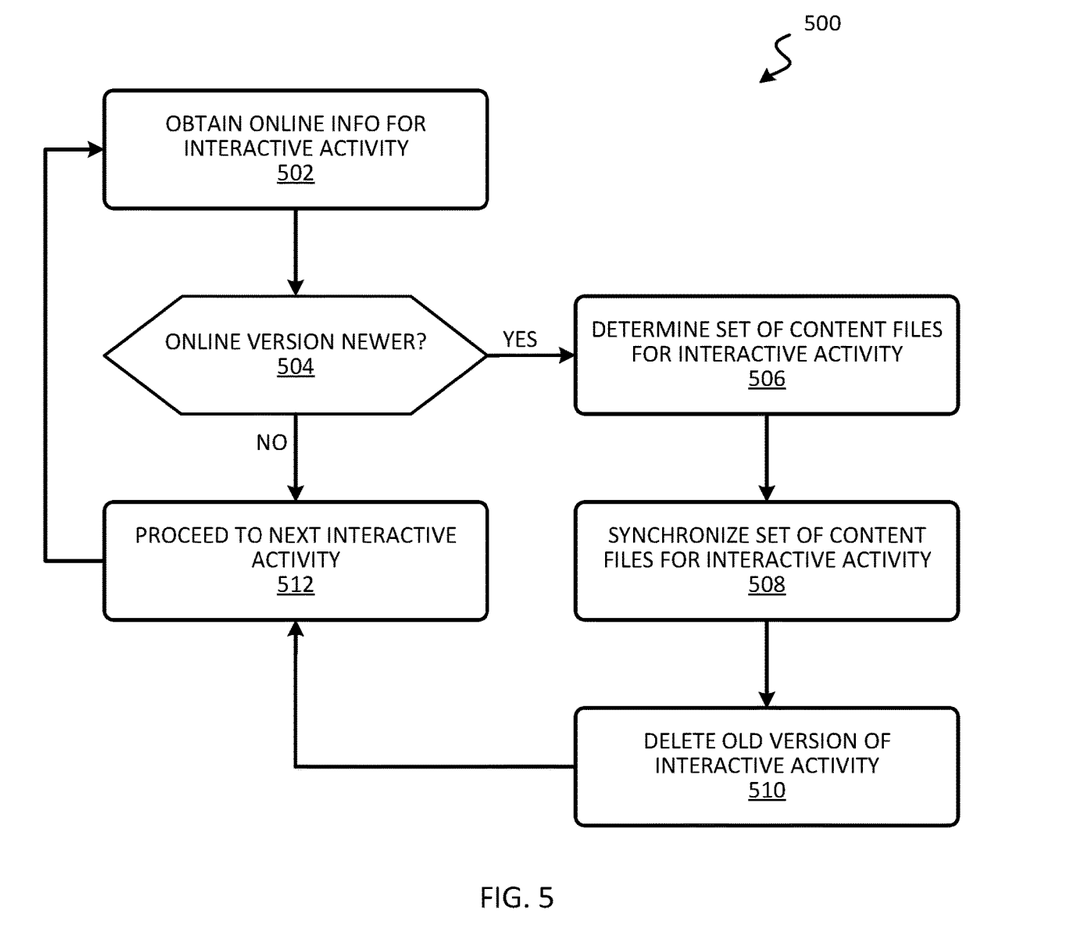
FIG. 5 illustrates a flow diagram of a process for synchronizing interactive activities, according to some embodiments

FIG. 5 illustrates a flow diagram of a process 500 for synchronizing interactive activities between the interactive content host and the client device, according to some embodiments. Process 500 can be used, for example, to implement the operations of block 410 in process 400. In some embodiments, synchronization and update of the interactive activities can be performed in the background once the SDK and/or GUI has been updated.

At block 502, the interactive learning application may obtain online information from the interactive content host for an interactive activity that is to be made available offline. For example, the version number of the newest version of the interactive activity available from the interactive content host can be obtained. At block 504, the interactive learning application determines if the online version of the interactive activity is newer than the local version on the client device. If it is determine that a newer version is not available, then at block 512, the interactive learning application proceeds to the next interactive activity until all offline interactive activities are up to date.

If it is determine that a newer version is not available, then at block 506, the interactive learning application determines a set of content files corresponding to the interactive activity. The set of content files may include may include images, audio, video, and/or executable code (e.g., web-based executable scripts) that are used to generate and execute the interactive activity on the client device. In some embodiments, the set of content files can be determined by retrieving the latest content description file associated with the interactive activity from the interactive content host. The content description file may include a listing of the content files corresponding to the interactive activity, and may also include the size, version number, checksum, etc. of each content file.

At block 508, the set of content files for the interactive activity is synchronized from the interactive content host to the client device. In some embodiments, only content files that have been updated or modified need to be downloaded. For example, the version number of the content file can be compared between the latest content description file from the interactive content host and the local copy of the content description file to determine if a particular content file has been updated or modified. Once a content file has been downloaded, the size and checksum of the downloaded content file can be compared against the information in the latest content description file to verify that the content file was downloaded correctly without transmission errors. The content description file of the interactive activity indicating the set of content files that corresponds to the interactive activity can also be synchronized from the interactive content host to the client device.

In some embodiments, an interactive activity may be an engine-based interactive activity that is dependent on an activity engine shared amongst other interactive activities. In such scenarios, the activity engine can be synchronized prior to synchronizing the one or more content files corresponding to the interactive activity. The activity engine may have its own content description file, and update of the activity engine at the client device can be performed in a similar manner as described above. In some embodiments, the set of content files for an interactive activity can be arranged in a particular directory structure at the interactive content host, and synchronizing the content files from the interactive content host to the client device may include synchronizing the directory structure. By maintain the same directory structure, relative paths in the executable code can be used to reference the different content files. This can allow an interactive activity to be executed seamlessly between online and offline modes when the executable code references different content files in the directory structure.

At block 510, when all updated content files have been downloaded, the old version of the interactive activity can be deleted. In some embodiments, to allow an interactive activity to roll back to a previous version, prior versions of the content description file can optionally be maintained at the client device. After deletion of the old version of the interactive activity, the interactive learning application may proceed to the next interactive activity at block 512 to repeat the process until all offline interactive activities are up to date.

Figure 6:
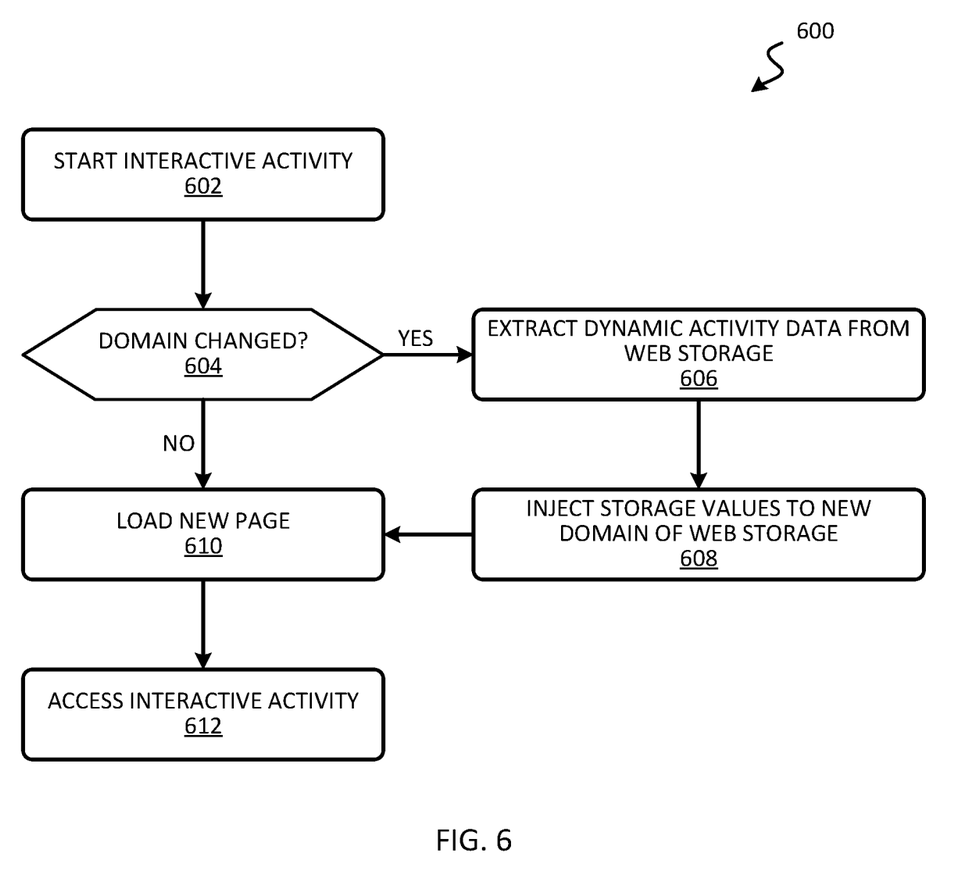
FIG. 6 illustrates a flow diagram of a process for executing an interactive activity, according to some embodiments.

Referring back to FIG. 4, after all offline interactive activities are up to date, a user may launch and execute an interactive activity at block 412 on the client device. FIG. 6 illustrates a flow diagram of a process 600 for executing an interactive activity, according to some embodiments. At block 602, an interactive activity is started on the client device. For example, a user may select an interactive activity to execute from the favorites menu, and the interactive learning application may execute a web browser on the client device to launch the interactive activity. If the client device has network connectivity and is online, the web browser may execute the interactive activity from the remote interactive content host. While the client device is online, the interactive activity may write dynamic activity data into the web storage of the web browser. Because the interactive activity is being executed from the web, data written to the web storage is bound to the web domain. Similarly, if the client device is offline, the web browser may execute the interactive activity from the local content library. While the client device is offline, the interactive activity may write dynamic activity data into the web storage of the web browser. Because the interactive activity is being executed offline, data written to the web storage is bound to the local domain.

At block 604, the interactive learning application determines if the execution domain of the client device has changed. This can be performed in response to the web browser being navigated to another web page or web application, the web browser reloading a web page or web application, and/or an interactive activity being launched. For example, the interactive learning application may determine that the client device is offline after being previously online, and hence the execution domain has changed. The interactive learning application may then proceed to block 606 to synchronize the dynamic activity data for the interactive activity from the web domain associated with the interactive content host to the local domain of the client device in the web storage integrated with the web browser of the client device. As another example, if the web browser on the client device is executed to launch the interactive activity while the client device is online after having been previously offline, the execution domain has changed. The interactive learning application may then proceed to block 606 to synchronize the dynamic activity data for the interactive activity from the local domain to the web domain of the web storage integrated with the web browser of the client device.

At block 606, before the web browser navigates to a new page (e.g., another web page or web application, reloads a current web page or web application, and/or launches another interactive activity), the dynamic activity data from the web storage is extracted and cached to the application memory of the interactive learning application. Thus, if the client device was previously online, the dynamic activity data in the web domain of the web storage will be extracted. If the client device was previously offline, the dynamic activity data in the local domain of the web storage will be extracted.

At block 608, the web browser starts a new page and before loading any content, the cached storage values of the dynamic activity data are injected into the new domain of the web storage. For example, if the client device was previously online and is now offline, the new page will be executed from the local domain, and the cached dynamic activity data will be injected into the local domain of the web storage. If the client device was previously offline and is now online, the new page will be executed from the web domain, and the cached dynamic activity data will be injected into the web domain of the web storage. In some embodiments, if the client device was previously offline and is now online, the cached dynamic activity data can also be uploaded to the remoter interactive content host to synchronize any changes made to the dynamic activity data while the client device was offline.

At block 610, the web browser proceeds to load the new page from the current domain of the client device. If a domain change was not detected at block 604, the new page can simply access the dynamic activity data in the web storage from the same domain as the previous page. If a domain change was detected at 604, the new page is loaded from the new domain, and the new page can access the dynamic activity data in the web storage of the new domain. Because the dynamic activity data was synchronized from the previous domain to the new domain at blocks 608 and 610, any changes to the dynamic activity data made in the previous domain are reflected in the new domain. As such, transitions between online and offline access to the interactive activity can be made transparent to the user, and will not cause interruption to the user's progress in the interactive activity. At block 612, the user may proceed to access the interactive activity, and continue with the progress or game play in a curriculum by interacting with the interactive activity content.

Accordingly, by employing the techniques described herein, seamless offline access to web-based interactive activity content can be achieved. It should be understood that the techniques described herein for synchronizing the contents of the web storage across different domains are not limited to interactive learning applications, and can be used with other types of web-based applications or web pages that utilizes web storage of a web browser. Furthermore, in some embodiments, the entire contents of the web storage can be synchronized across domains (e.g., from one web page or application to another, or from online to offline, etc.) irrespective of what types of data are being stored in the web storage of a web browser. For example, in some embodiments, in addition to dynamic activity data, depending on the size limitations of the web storage, content files can also be stored in the web storage and be synchronized across domains. In some embodiments in which the web storage may support only storage of string values, the content files can be converted to character strings before being stored in the web storage.

It should also be understood that although the client device may execute an interactive activity from an online interactive content host when network connectivity is available, the client device may alternatively execute the interactive activity from the local content library in an offline manner even when network connectivity is available. This can improve the execution speed of the interactive activity as the content files are accessed locally on the client device as opposed to over a network. In such scenarios, the interactive activity can be accessed in an offline manner using the dynamic activity data in the local domain of the web storage while the client device is online.

Figure 7:
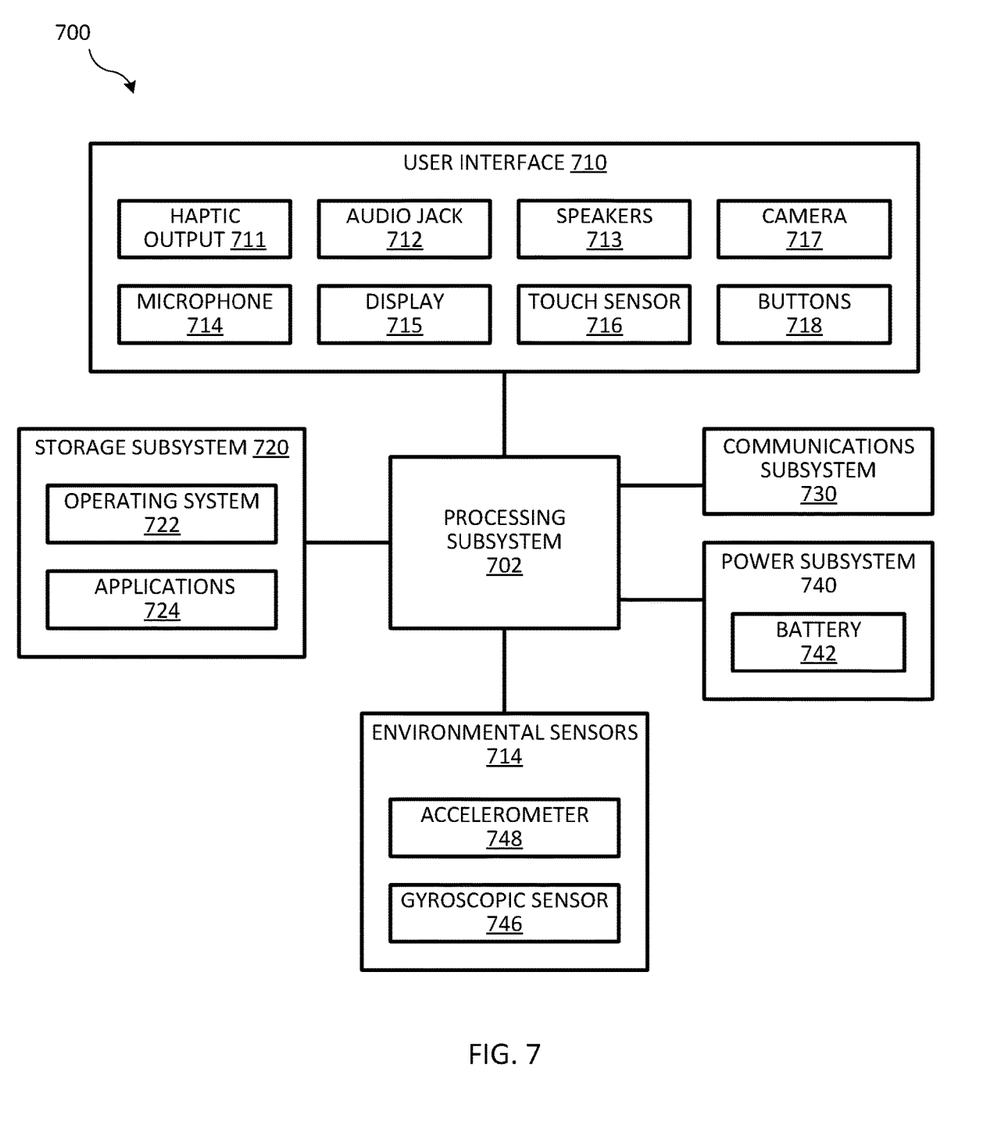
FIG. 7 illustrates a block diagram of a client device, according to some embodiments.

FIG. 7 illustrates a block diagram of a client device 700, according to some embodiments. Client device 700 can include processing subsystem 702, storage subsystem 720, user interface 710, communications subsystem 730, power subsystem 740, and environmental sensors 714. Client device 700 can also include fewer components and/or other components not explicitly shown.

Storage subsystem 720 can be implemented, for example, using magnetic storage media, flash memory, other semiconductor memory (e.g., DRAM, SRAM), or any other non-transitory storage medium, or a combination of media, and can include volatile and/or non-volatile media. In some embodiments, storage subsystem 720 can store an operating system 722 and one or more applications 724 to be executed by processing subsystem 702, such as a web browser, SDK, or other interactive applications.

User interface 710 can include any combination of input and output elements. A user can operate input elements of user interface 710 to invoke the functionality of client device 700 and/or of another device communicatively coupled to client device 700, and can view, hear, and/or otherwise experience output from client device 700 via output elements of user interface 710. Some user interface elements can provide both input and output functionalities. Examples of output elements can include display 715, speakers 713, and haptic output generator 711. Haptic output generator 711 can be a device that converts electronic signals into vibrations that can be felt by a user of client device 700. Examples of input elements can include microphone 714, touch sensor 716, camera 717, and one or more physical buttons 719. Touch sensor 716 can include, for example, a capacitive sensor array with the ability to localize contacts to a particular point or region on the surface of the sensor. In some embodiments, touch sensor 716 can be overlaid on display 715 to provide a touchscreen interface, and processing subsystem 702 can translate touch events (including taps and/or other gestures made with one or more contacts) into specific user inputs depending on what is currently displayed on display 715. In some embodiments, user interface 710 can provide output to and/or receive input from an accessory device such as a headset. For example, audio jack 712 can connect via an audio cable to an auxiliary device.

Processing subsystem 702 can be implemented as one or more integrated circuits, e.g., one or more single core or multicore microprocessors and/or microcontrollers. In operation, processing system 702 can control the operation of client device 700. In various embodiments, processing subsystem 702 can execute a variety of programs in response to program code and can maintain multiple concurrently executing programs or processes. At any given time, some or all of the program code to be executed can be resident in processing subsystem 702 and/or in storage media such as storage subsystem 720.

Communications subsystem 730 may allow client device 700 to communicate wirelessly or through a wired connection with various other devices. For example, RF transceiver components such as an antenna and supporting circuitry can enable data communication over a wireless medium using any one or more suitable protocols for wireless data communication. Power subsystem 740 can provide power and power management capabilities for client device 700 including a battery 742 (e.g., a rechargeable battery). Environmental sensors 714 can include various electronic, mechanical, electromechanical, optical, or other devices that provide information related to external conditions around client device 700. Any type and combination of environmental sensors can be used such as accelerometer 748, gyroscope 746, etc.

Figure 8:
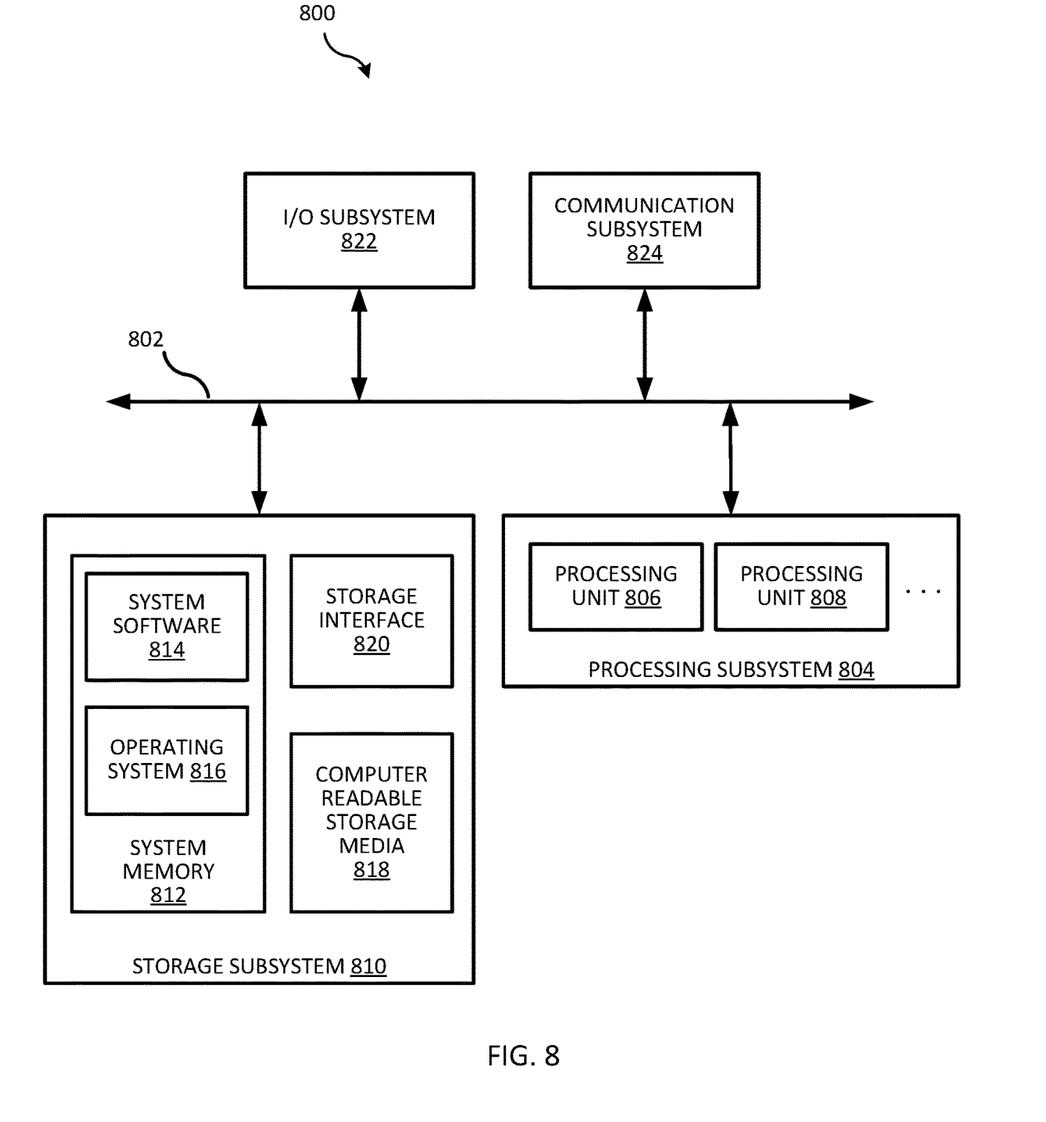
FIG. 8 illustrates a block diagram of a computing device, according to some embodiments.

FIG. 8 illustrates a block diagram of a computing system 800 (e.g., implementing an interactive content host server), in accordance with some embodiments. Computing system 800 can include a communications bus 802 that connections one or more subsystems, including a processing subsystem 804, storage subsystem 810, I/O subsystem 822, and communication subsystem 824. Processing subsystem 804 can include one or more processing units 806, 808, etc. The processing units can include one or more of a general purpose or specialized microprocessor, FPGA, DSP, or other processor. In some embodiments, each processing unit can be a single core or multicore processor.

Storage subsystem 810 can include system memory 812 which can include various forms of non-transitory computer readable storage media, including volatile (e.g., RAM, DRAM, cache memory, etc.) and non-volatile (flash memory, ROM, EEPROM, etc.) memory. Memory may be physical or virtual. System memory 812 can include system software 814 (e.g., BIOS, firmware, various software applications, etc.) and an operating system 816. In some embodiments, storage subsystem 810 can include non-transitory computer readable storage media 818 (e.g., hard disk drives, floppy disks, optical media, magnetic media, and other media). A storage interface 820 can allow other subsystems within computing system 800 and other computing systems to store and/or access data from storage subsystem 810.

In some embodiments, I/O subsystem 822 can interface with various input/output devices, including displays (such as monitors, televisions, and other devices operable to display data), keyboards, mice, voice recognition devices, biometric devices, printers, plotters, and other input/output devices. I/O subsystem can include a variety of interfaces for communicating with I/O devices, including wireless connections and physical connections. Communication subsystem 824 can also include various communication interfaces including wireless connections and physical connections. The communication interfaces can enable computing system 800 to communicate with other computing systems and devices over local area networks wide area networks, ad hoc networks, mesh networks, mobile data networks, the internet, and other communication networks.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A method comprising:
   determining, by an interactive learning application executing on a client device, a web-based interactive activity to be made available offline;
   determining, by the interactive learning application, a set of content files corresponding to the web-based interactive activity;
   synchronizing, by the interactive learning application, one or more of the content files from a remote server to the client device;
   executing, by the interactive learning application, a web browser on the client device to launch the web-based interactive activity, the web browser having a web storage on the client device dedicated for use by the web browser, the web storage including a web domain and a local domain, wherein the web domain stores data when interacting with the remote server, and the local domain retains data after the web browser is closed;
   determining, by the interactive learning application, that the client device is offline;
   synchronizing, by the interactive learning application, dynamic activity data for the web-based interactive activity from the web domain of the web storage of the web browser to the local domain of the web storage of the web browser of the client device; and
   accessing, by the interactive learning application, the web-based interactive activity while offline using the dynamic activity data in the local domain of the web storage of the web browser of the client device.

2. The method of claim 1, further comprising:
   executing, by the interactive learning application, the web browser on the client device to launch the web-based interactive activity while the client device is online; and
   synchronizing, by the interactive learning application, the dynamic activity data for the web-based interactive activity from the local domain to the web domain of the web storage.

3. The method of claim 1, wherein the web-based interactive activity is dependent on an activity engine that is shared amongst other web-based interactive activities.

4. The method of claim 3, further comprising:
   synchronizing the activity engine prior to synchronizing the one or more content files corresponding to the web-based interactive activity.

5. The method of claim 1, wherein the set of content files is arranged in a directory structure at the remote server, and synchronizing the one or more content files from the remote server to the client device includes synchronizing the directory structure.

6. The method of claim 1, wherein communications with the remote server are performed via an application programming interface, and the method further comprises synchronizing the application programming interface from the remote server to the client device.

7. The method of claim 6, wherein the application programming interface is synchronized prior to synchronizing the one or more content files corresponding to the web-based interactive activity.

8. The method of claim 1, wherein the set of content files includes one or more web-based executable scripts.

9. The method of claim 1, further comprising:
   synchronizing, from the remote server to the client device, a content description file of the web-based interactive activity indicating the set of content files that corresponds to the web-based interactive activity.

10. The method of claim 1, further comprising:
    accessing the web-based interactive activity using the dynamic activity data in the local domain of the web storage while the client device is online.

11. A client device comprising:
    a processor; and
    a memory storing executable code that implements an interactive learning application, which when executed by the processor, causes the client device to:
    determine a web-based interactive activity to be made available offline;
    determining a set of content files corresponding to the web-based interactive activity;
    synchronize one or more of the content files from a remote server to the client device;
    execute a web browser on the client device to launch the web-based interactive activity, the web browser having a web storage on the client device dedicated for use by the web browser, the web storage including a web domain and a local domain, wherein the web domain stores data when interacting with the remote server, and the local domain retains data after the web browser is closed;
    determine that the client device is offline;
    synchronize dynamic activity data for the web-based interactive activity from the web domain of the web storage of the web browser to the local domain of the web storage of the web browser of the client device; and
    access the web-based interactive activity while offline using the dynamic activity data in the local domain of the web storage of the web browser of the client device.

12. The client device of claim 11, wherein the executable code further causes the client device to:
    execute the web browser on the client device to launch the web-based interactive activity while the client device is online; and
    synchronize the dynamic activity data for the web-based interactive activity from the local domain to the web domain of the web storage.

13. The client device of claim 11, wherein the web-based interactive activity is dependent on an activity engine that is shared amongst other web-based interactive activities.

14. The client device of claim 13, wherein the executable code further causes the client device to synchronize the activity engine prior to synchronizing the one or more content files corresponding to the web-based interactive activity.

15. The client device of claim 11, wherein the set of content files is arranged in a directory structure at the remote server, and the executable code further causes the client device to synchronize the directory structure.

16. The client device of claim 11, wherein communications with the remote server are performed via an application programming interface, and the executable code further causes the client device to synchronizing the application programming interface.

17. The client device of claim 16, wherein the application programming interface is synchronized prior to synchronizing the one or more content files corresponding to the web-based interactive activity.

18. The client device of claim 11, wherein the set of content files includes one or more web-based executable scripts.

19. The client device of claim 11, wherein the executable code further causes the client device to synchronize, from the remote server to the client device, a content description file of the web-based interactive activity indicating the set of content files that corresponds to the web-based interactive activity.

20. The client device of claim 11, wherein the executable code further causes the client device to access the web-based interactive activity using the dynamic activity data in the local domain of the web storage while the client device is online.

* * * * *